United States Patent
Chang et al.

(10) Patent No.: US 9,240,667 B2
(45) Date of Patent: Jan. 19, 2016

(54) OPTICAL PUMPING APPARATUS FOR FEW-MODE FIBER AMPLIFICATION

(71) Applicant: Electronics and Telecommunications Research Institute, Daejeon (KR)

(72) Inventors: Sun-Hyok Chang, Daejeon (KR); Hwan-Seok Chung, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 14/308,442

(22) Filed: Jun. 18, 2014

(65) Prior Publication Data
US 2015/0015939 A1 Jan. 15, 2015

(30) Foreign Application Priority Data
Jul. 15, 2013 (KR) .................. 10-2013-0082898

(51) Int. Cl.
| H01S 3/094 | (2006.01) |
| G02B 6/28 | (2006.01) |
| H01S 3/09 | (2006.01) |
| H01S 3/0941 | (2006.01) |

(52) U.S. Cl.
CPC ........ *H01S 3/094003* (2013.01); *G02B 6/2804* (2013.01); *H01S 3/09415* (2013.01); *H01S 3/094053* (2013.01); *H01S 3/094069* (2013.01)

(58) Field of Classification Search
CPC .......... H01S 3/06754; H01S 3/094003; H01S 3/094069; H04B 10/2931
See application file for complete search history.

(56) References Cited

U.S. PATENT DOCUMENTS

| 5,187,759 A * | 2/1993 | DiGiovanni et al. ............ 385/27 |
| 5,263,036 A * | 11/1993 | De Bernardi et al. ............ 372/6 |
| 2001/0043388 A1* | 11/2001 | Danziger et al. ........... 359/341.3 |
| 2012/0262780 A1* | 10/2012 | Bai et al. ................. 359/337.11 |
| 2012/0328255 A1 | 12/2012 | Bickham |
| 2013/0163072 A1* | 6/2013 | Chang et al. ............... 359/341.3 |
| 2014/0168756 A1* | 6/2014 | Zhu ............................ 359/341.5 |

FOREIGN PATENT DOCUMENTS

KR 1020060046888 A 5/2006

OTHER PUBLICATIONS

Bai et al. Mode-division multiplexed transmission with inline few-mode fiber amplifier, Optics Express, vol. 20, No. 3, pp. 2669-2680 (Jan. 30, 2012).*
Neng Bai et al., Mode-division multiplexed transmission with inline few-mode fiber amplifier, Optical Society of America, 2012, pp. 1-13, vol. 20, No. 3.

* cited by examiner

*Primary Examiner* — Eric Bolda
(74) *Attorney, Agent, or Firm* — William Park & Associates Ltd.

(57) ABSTRACT

An optical pumping apparatus for few-mode fiber amplification is provided. The optical pumping apparatus includes an optical pump source configured to generate an optical pump; an optical power divider configured to divide an optical power of the optical pump from the optical pump source so as to output several optical pumps with uniformly distributed optical power; and a modal multiplexer configured to receive the optical pumps from the optical power divider through a plurality of single-mode fibers, multiplex the received optical pumps, apply a multiplexed optical pump to each mode of a few-mode fiber (FMF) amplifier, and adjust a gain difference among modes, wherein the FMF amplifier obtains a gain by amplifying an optical signal with the optical pump.

17 Claims, 10 Drawing Sheets

OPTICAL PUMPING APPARATUS FOR FEW-MODE FIBER AMPLIFICATION

CROSS-REFERENCE TO RELATED APPLICATION(S)

This application claims priority of Korean Patent Application No. 10-2013-0082898, filed on Jul. 15, 2013, in the Korean Intellectual Property Office, the disclosure of which is incorporated herein by reference in its entirety.

BACKGROUND

1. Field

The following description relates to optical communications, and more particularly, to optical pumping.

2. Description of the Related Art

As an attempt to increase the capacity of an optical transmission link whose bandwidth is saturated, space-division-multiplexed optical transmission techniques have been studied. As one of the methods, the mode-division-multiplexed optical transmission which uses a few-mode fiber (FMF) as an optical link has been researched. A few-mode fiber has a single core and supports a number of modes, and an individual signal is transmitted through each mode, thus making it possible to increase the transport capacity in accordance with the number of modes supported by the FMF. For long-distance optical transmission using mode-division multiplexing, a few-mode fiber amplifier is required to amplify an optical signal that is attenuated while propagating along an optical link.

SUMMARY

The following description relates to an optical pumping apparatus for preventing gain difference among modes in a few-mode fiber amplifier.

In one general aspect, there is provided an optical pumping apparatus including: an optical pump source configured to generate an optical pump; an optical power divider configured to divide an optical power of the optical pump from the optical pump source so as to output several optical pumps with uniform optical power; and a modal multiplexer configured to receive the optical pumps from the optical power divider through a plurality of single-mode fibers, multiplex the received optical pumps, apply a multiplexed optical pump to each mode of a few-mode fiber (FMF) amplifier, and adjust a gain difference among modes, wherein the FMF amplifier obtains a gain by amplifying an optical signal with the optical pump.

In another general aspect, there is provided an optical pumping apparatus including: a plurality of optical pump sources configured to generate optical pumps; and a modal multiplexer configured to receive the optical pumps through a plurality of single-mode fibers, respectively, multiplex the received optical pumps and apply a multiplexed optical pump to each mode of a is few-mode fiber (FMF) amplifier, and adjust a gain difference among modes, wherein the FMF amplifier obtains a gain by amplifying an optical signal with the optical pump.

In another general aspect, there is provided an optical pumping apparatus including: an optical pump source configured to generate an optical pump; an optical power divider configured to divide an optical power of the optical pump from the optical pump source so as to output several optical pumps with uniform optical power; and a modal multiplexer configured to receive the optical pumps from the optical power divider through a plurality of single-mode fibers, multiplex the received optical pumps, apply a multiplexed optical pump to each mode of a single few-mode fiber (FMF), and adjust a gain difference among modes, wherein a gain is obtained by amplifying an optical signal with the optical pump in the FMF.

Other features and aspects will be apparent from the following detailed description, drawings, and claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Figure 1:
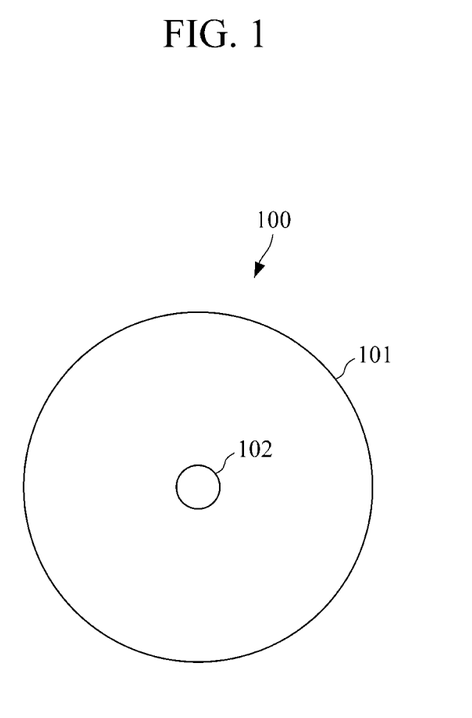
FIG. 1 is a diagram illustrating a cross-section of an optical fiber upon which an exemplary embodiment is implemented.

FIG. 1 is a diagram illustrating a cross-section of an optical fiber upon which an exemplary embodiment is implemented.

Referring to FIG. 1, the optical fiber 100 consists of a cladding 101 and a single core 102 when the cross-section is viewed/seen from a perpendicular aspect of its longitudinal direction.

The cladding 101 and the core 102 are basically made of $SiO_2$ glass, and by adding a small amount of additives such as Ge, Al, or the like, its refractive index may be increased or reduced. The core 102 is made up of a higher refractive index than the cladding 101. As most of the optical power of an optical signal is propagated to the confines of the core 102 and its vicinity, the optical signal is transmitted toward the longitudinal direction of the optical fiber. In addition, the number of modes of a propagating optical signal may be adjusted by adjusting the size of the core 102 and its refractive index difference from the cladding 101 among others.

The optical fiber 100 used for optical communications may be classified into a single-mode fiber (SMF) and a multi-mode fiber (MMF), also known as few-mode fiber (FMF). The SMF supports one mode, while the MMF/FMF supports at least two modes. An optical fiber that is designed to support between about two to ten modes is more specifically referred to as a few-mode fiber (FMF).

Figure 2:
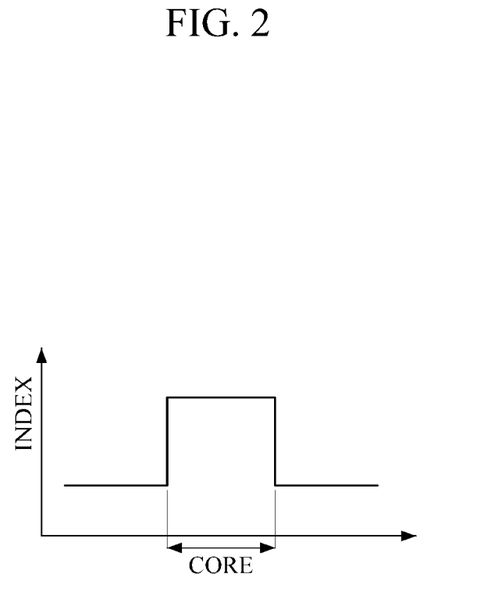
FIG. 2 is a graph showing a refractive index of an optical fiber upon which an exemplary embodiment is implemented.

FIG. 2 is a graph showing a refractive index of a step-index optical fiber upon which an exemplary embodiment is implemented.

Referring to FIG. 2 the optical fiber has a step-index profile characterized by a constantly greater refractive index of a core over refractive index of cladding.

Figure 3:
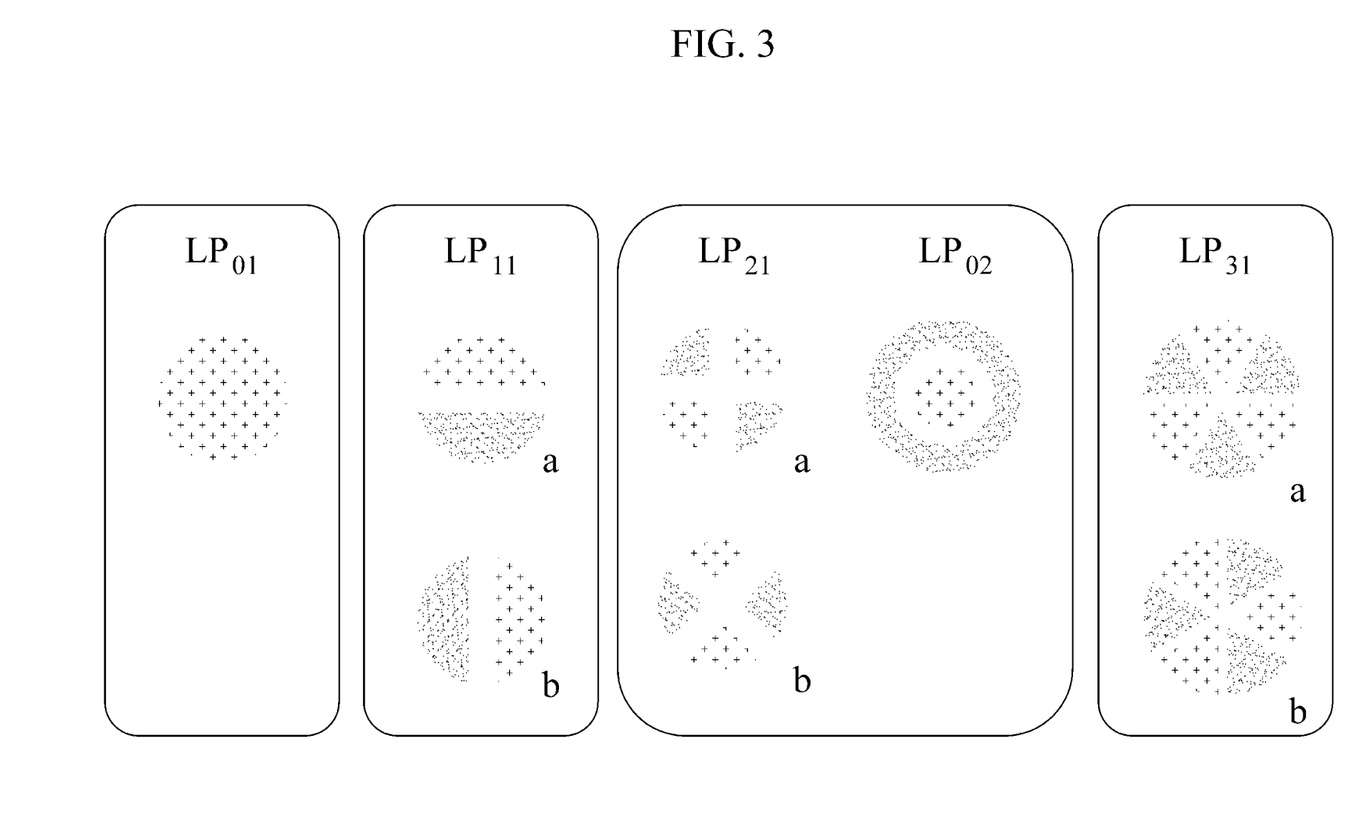
FIG. 3 is a diagram illustrating a cross-section of a single core fiber upon which an exemplary embodiment is implemented.

FIG. 3 is a diagram illustrating a cross-section of a single core fiber upon which an exemplary embodiment is implemented. More specifically, FIG. 3 illustrates modes that can be supported by the optical fiber with the step-index profile of FIG. 2.

Referring to FIG. 3, if a difference in the refractive index between a core and cladding is uniform throughout the optical fiber, the larger the core size is, the more various modes the optical fiber can support in order starting from the figure's mode on the left. In FIG. 3, sections marked by a cross (+) and sections indicated by a dot (•) may have a 180-degree phase difference therebetween, and the distribution of optical intensity may vary within each section.

In FIG. 3, mode $LP_{01}$ is a fundamental mode which essentially sits in the profile of the core. A fiber that is designed to support only mode $LP_{01}$ is referred to as a "single mode fiber (SMF)." The fiber with an increased core size is able to support mode $LP_{11a}$ and mode $LP_{11b}$ along with mode $LP_{01}$. Mode $LP_{11a}$ and mode $LP_{11b}$ are degenerated modes with the same propagation constant. The fiber with a further increased size of the core may also be able to support mode $LP_{21a}$, mode $LP_{21b}$, and mode $LP_{02}$. These three modes are also degenerated. With an even further increased size of the core, the fiber can support mode $LP_{31a}$ and mode $LP_{31b}$ in addition to the above six modes. As such, the number of modes propagating through the fiber can be controlled by changing the fiber design, such as the size of a core and distribution of a refractive index, and such an optical fiber that is designed to support several modes is considered as a "few-mode fiber."

Independent signals carried by different modes are transmitted through a few-mode fiber to an optical link, so that the transmission capacity can be increased corresponding to an increase in the number of modes, which is referred to as "mode-division-multiplexed optical transmission." For long-distance optical transmission, the means for amplifying an intensity of an optical signal attenuated during transmission is needed. That is, a few-mode fiber (FMF) amplifier is required to simultaneously amplify several mode signals.

Figure 4:
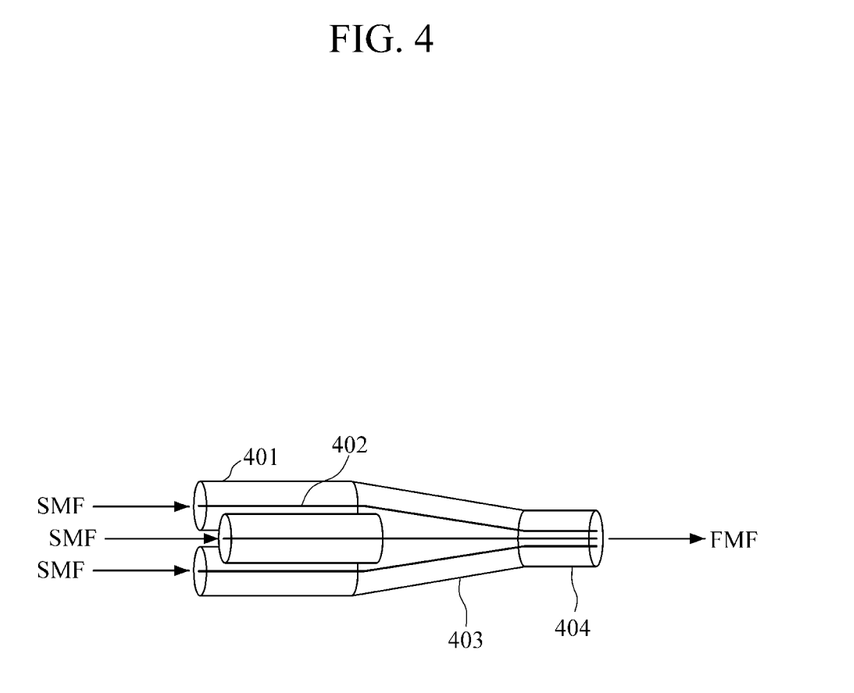
FIG. 4 is a diagram illustrating a modal multiplexer according to an exemplary embodiment.

FIG. 4 is a diagram illustrating a modal multiplexer according to an exemplary embodiment.

To reduce the gain difference among modes in an FMF amplifier, the FMF amplifier needs to be optically pumped, such that the pump beams can be evenly distributed among several modes. In one example illustrated in FIG. 4, an input port 401 is formed by three SMFs 401 gathered in an equilateral triangle shape, and an end portion of a modal multiplexer, as indicated in reference numeral 403, is tapered resulting in the reduction of its diameter. A tapering process allows for the connection between the end of the modal multiplexer and a few-mode fiber. Reference numeral 402 indicates the core of each SMF. In the modal multiplexer, the three cores in the input ports 401 are placed at a sufficient distance from one another, preventing any coupling therebetween, whereas the three cores become so close to one another in an output port 404 that strong coupling takes place.

The example shown in FIG. 4 assumes that the FMF can support only three modes: $LP_{01}$, $LP_{11a}$, and $LP_{11b}$. Modes supported by the output port 404 with a three-core structure including the cores in a triangular arrangement may be largely similar to modes $LP_{01}$, $LP_{11a}$, and $LP_{11b}$ of an FMF, and it is possible to directly connect these modes to an FMF by adjusting the number of numerical apertures of the output port 404. When an optical signal is input to each of the SMFs 401, it results in an output of a linear combination of modes $LP_{01}$, $LP_{11a}$, and $LP_{11b}$ through output port 404. It is noted that when the same optical power is input to each of the three SMFs, the optical power is evenly distributed among the modes.

In FIG. 4, there are three SMF inputs due to the assumption that the FMF may operate in three modes. However, for an FMF capable of supporting six modes ($LP_{01}$, $LP_{11a}$, $LP_{11b}$, $LP_{21a}$, $LP_{21b}$, and $LP_{02}$), there should be six SMF inputs. In this case, the output port 404 may have a core structure in which five of the cores are arranged in a pentagon shape with the remaining one located at the center. This core structure brings about modes similar to modes $LP_{01}$, $LP_{11a}$, $LP_{11b}$, $LP_{21a}$, $LP_{21b}$, and $LP_{02}$ of the FMF.

In a similar manner, the number of SMF inputs is dependent upon the number of modes supportable by the FMF, and the gaps between the cores along with the core structure of the output port 404 are determined accordingly. The same intensity of optical power inserted into each of the SMF inputs results in the uniform distribution of optical power among the modes.

Figure 5:
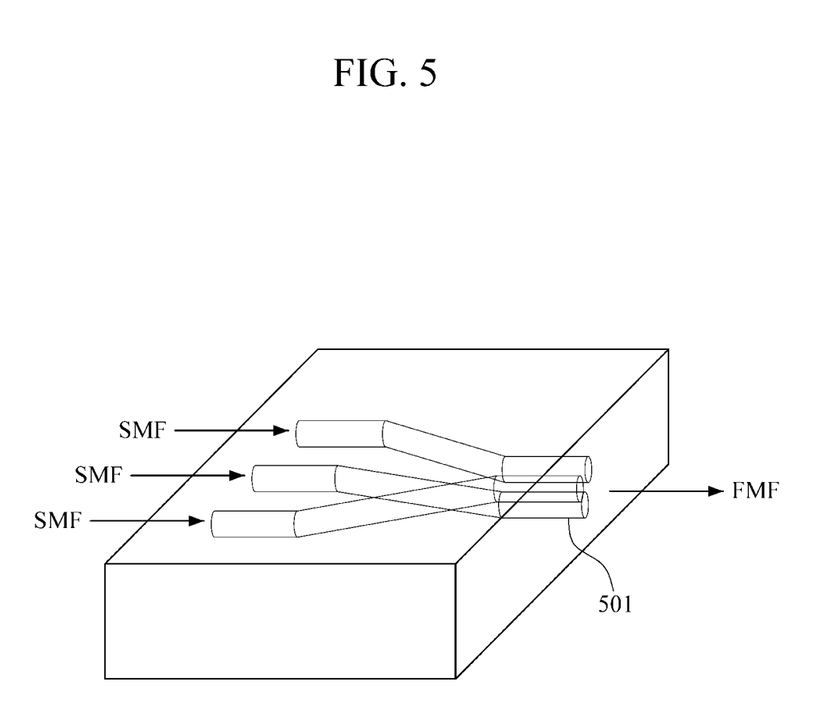
FIG. 5 is a diagram illustrating a modal multiplexer according to another exemplary embodiment.

FIG. 5 is a diagram illustrating a modal multiplexer according to another exemplary embodiment.

More specifically, the modal multiplexer of FIG. 5 is theoretically the same as the modal multiplexer of FIG. 4, but is different in terms of their manufacturing methods. The modal multiplexer shown in FIG. 5 includes three-dimensional waveguides formed by an ultrafast laser inscription method by which the refractive index of glass or crystal is partially changed.

Referring to FIG. 5, three waveguides in output ports 501 of the modal multiplexer are formed close together in an equilateral triangle. In this configuration, modes $LP_{01}$, $LP_{11a}$, and $LP_{11b}$, which are similar to the FMF modes, are generated. As described with reference to FIG. 4, the number of SMF inputs is decided by the number of modes supported by the FMF.

Various exemplary embodiments, in which the modal multiplexers of FIG. 4 and FIG. 5 are applied to a few-mode fiber amplifier, will be described with reference to FIGS. 6 to 10. In FIGS. 6 to 9, a few-mode erbium doped fiber (FM-EDF) amplifier will be taken as an example of the few-mode fiber amplifier, but the exemplary embodiments will not be limited thereto.

Figure 6:
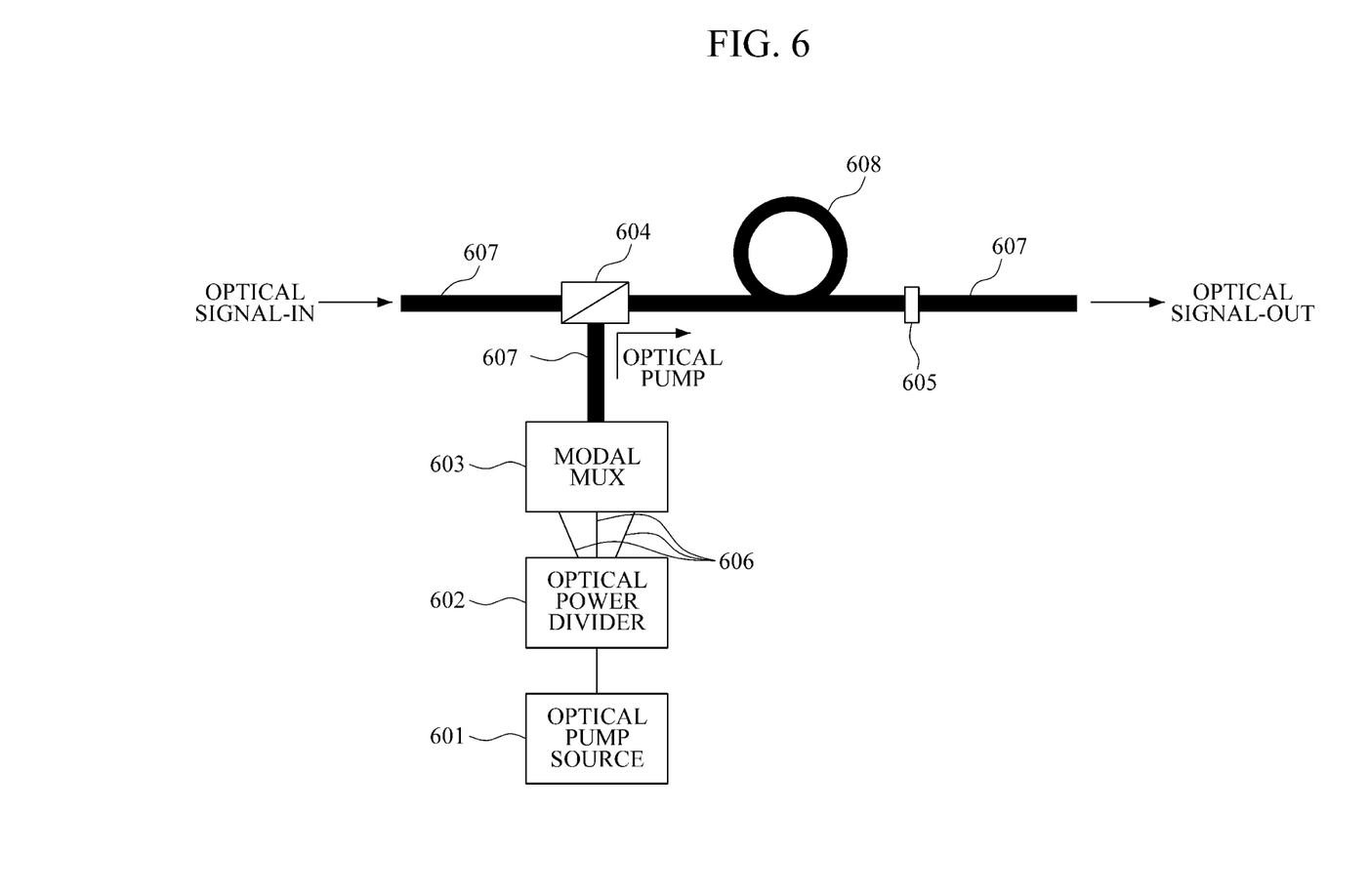
FIG. 6 is a diagram illustrating optical pumping of the few-mode fiber (FMF) amplifier according to an exemplary embodiment.

FIG. 6 is a diagram illustrating an optical pumping of the few-mode fiber (FMF) amplifier according to an exemplary embodiment.

An example of FIG. 6 assumes that FMF 607 and FM-EDF amplifier 608 each can support three modes: $LP_{01}$, $LP_{11a}$, and $LP_{11b}$. Also, it is assumed that an optical pump generated by an optical pump source 601 has a wavelength of 1480 nm, and an optical signal transmitted through the FMF 607 has a C-band wavelength of 1550 nm.

The optical pump source 601 generates an optical pump. An optical power divider 602 divides the optical power of the optical pump generated by the optical pump source 601. For example, as shown in FIG. 1, the optical power divider 602 divides the optical pump into three optical pumps with uniform optical power, and outputs the resulting optical pumps through three SMFs 606, respectively. In this case, an optical coupler may be used as a substitute for the optical power divider 602.

The three optical pumps from the optical power divider 602 are connected to inputs of the modal multiplexer 603, respectively, and the output of the modal multiplexer 603 is connected to the FMF 607. More specifically, the modal multiplexer 603 receives the optical pumps from the optical power divider 602 through the three SMFs 606, multiplexes the received optical pumps, and applies the multiplexed optical pump to different modes of the FM-EDF amplifier 608 of the FMF 607. Accordingly, it is possible to adjust a gain difference between modes, wherein the FM-EDF amplifier 608 obtains the gain by amplifying an optical signal with an optical pump.

A dichroic mirror 604 acts as a filter, and a wavelength-division coupler may be used as its substitute. The optical pump proceeds to the FM-EDF amplifier 608 as shown in FIG. 6, causing optical pumping in the FM-EDF amplifier 608. Reference numeral 605 represents an optical fiber connector or a fiber melting joint.

An optical signal is amplified by the optical pump in the FM-EDF amplifier 608, thereby obtaining a gain. The optical pumping structure proposed with reference to FIG. 6 allows the optical pump to be uniformly applied among the modes, and thereby the gains amongst the modes of the optical signal are evenly adjusted.

Although it is considered that the optical power divider 602 divides the optical pump evenly, the optical power of the optical pump may be individually adjusted in each SMF 606 in is order to offset any effect from mode dependent loss or the like.

In one example, in a case of an optical pump with a wavelength of 1480 nm, since the wavelength of the optical pump is similar to the wavelength of an optical signal of 1480 nm, the FMF 607 or the FM-EDF amplifier 608 can support as many modes as the number of optical signals. However, in a case where a wavelength of the optical pump is 980 nm, the FM-EDF amplifier 608 may be able to support higher modes. For example, at a wavelength of 980 nm, six modes, $LP_{01}$, $LP_{11a}$, $LP_{11b}$, $LP_{21a}$, $LP_{21b}$, and $LP_{02}$, may be supported by the FMF 607 or the FM-EDF amplifier 608.

The number of SMF inputs 606 is determined according to the number of modes capable of operating at a wavelength of 980 nm, and in this example, the number of SMF inputs 606 is changed to six, and accordingly, the structure of the modal multiplexer 603 also needs to be changed. Hence, similar to the case of a 1480-nm optical pump, the optical pump is uniformly launched into the modes of the FM-EDF amplifier 608, thus able to equally adjust the gains among the modes.

Figure 7:
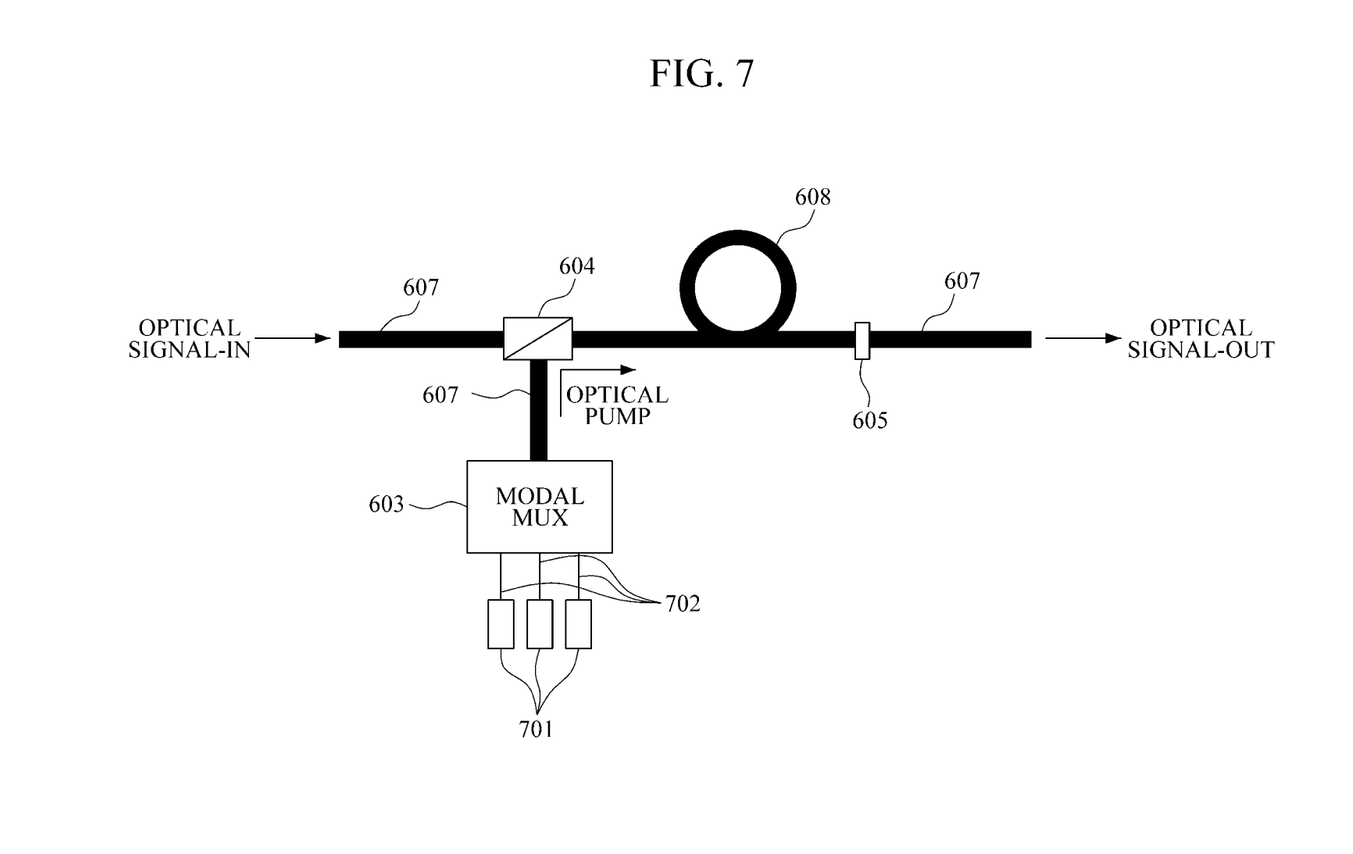
FIG. 7 is a diagram illustrating an optical pumping of an FMF amplifier according to another exemplary embodiment.

FIG. 7 is a diagram illustrating optical pumping of an FMF amplifier according to another exemplary embodiment.

Referring to FIG. 7, the FMF amplifier basically has a similar structure to that of the FMF amplifier of FIG. 6, except that three different optical pump sources 701 are connected to a modal multiplexer 603 through three SMFs 702, respectively.

In comparison to FIG. 6, multiple optical pump sources 701 of FIG. 7 each generate an optical pump, and the modal multiplexer 603 receives the optical pumps generated by the respective optical pump sources 701 through the respective SMFs 702, multiplexes the received optical pumps, and applies the multiplexed optical pump to each mode of an FM-EDF amplifier 608 of an optical link. Consequently, the difference in gains among the modes can be adjusted, is wherein a gain is obtained from an optical signal amplified by the FM-EDF amplifier 607 using an optical pump.

Figure 8:
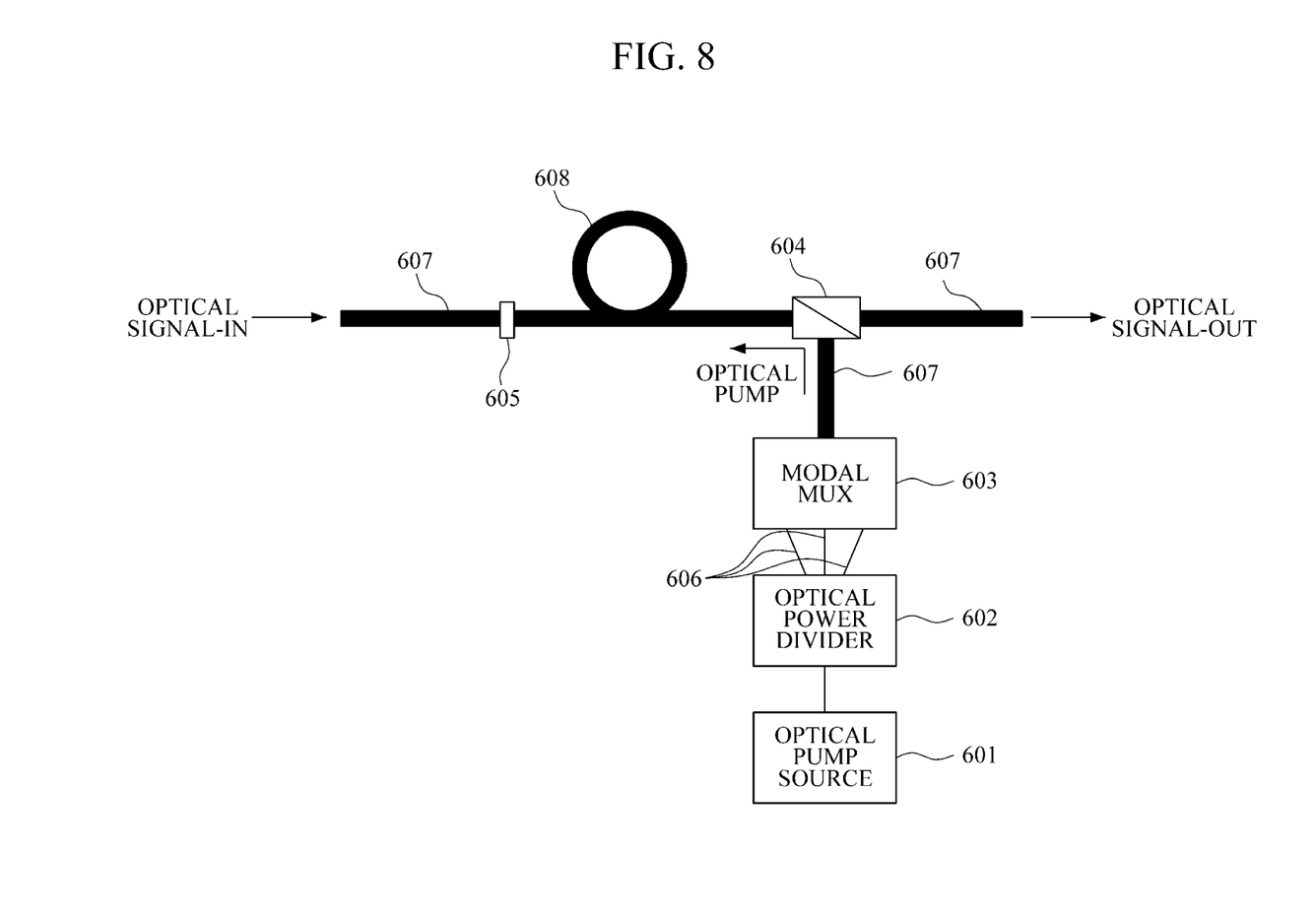
FIG. 8 is a diagram illustrating an optical pumping of an FMF amplifier according to yet another exemplary embodiment.

FIG. 8 is a diagram illustrating an optical pumping of an FMF amplifier according to yet another exemplary embodiment.

In the examples shown in FIGS. 6 and 7, the propagation direction of an optical pump is the same as the propagation direction of an optical signal. In FIG. 8, the optical pumping structure, however, may be configured to have the propagation directions of the optical pump and the optical signal opposite to each other.

Referring to FIG. 8, an optical output from an optical pump source 601 is divided into three optical pumps by an optical power divider 602. An optical coupler may be used as a substitute for the optical power divider 602. The three optical pumps from the optical power divider 602 are input to a modal multiplexer 603 through inputs of the modal multiplexer 603. An output from the modal multiplexer 603 is connected to an FMF. Reference numeral 604 is a dichroic mirror or a wavelength division coupler, and the optical pump is launched into an FM-EDF amplifier 608, as shown in FIG. 8. Reference numeral 605 denotes an optical fiber connector or a fiber melting joint. A gain is obtained by amplifying an optical signal in the FM-EDF amplifier 608 using an optical pump. The optical pumping structure proposed with reference to FIG. 8 allows the uniform distribution of optical pump among the modes, and thereby uniform gain of the optical signal is obtained regardless of the modes.

The optical pumping structure of FIG. 8 is almost the same as that of FIG. 6, except for the propagation direction of the optical pump. An optical pump may propagate in both directions by applying the optical pumping structures of both FIG. 6 and FIG. 8 to the same amplifier.

Figure 9:
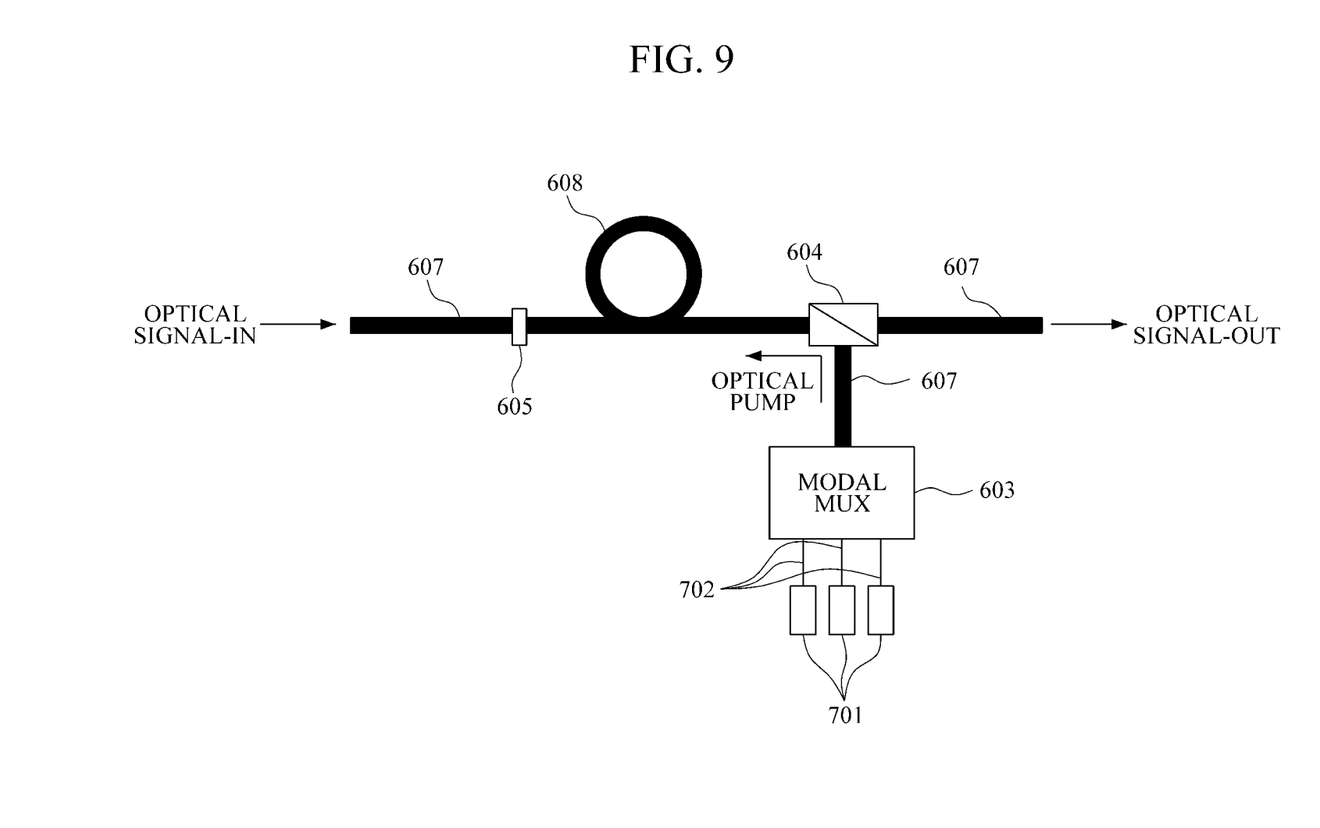
FIG. 9 is a diagram illustrating an optical pumping of an FMF amplifier according to another exemplary embodiment.

FIG. 9 is a diagram illustrating optical pumping of an FMF amplifier according to is another exemplary embodiment.

The optical pumping of FIG. 9 is implemented with a similar structure of FIG. 8, wherein the optical pumps individually generated by multiple optical pump sources 701 are connected to input ports of multiple SMFs 702, respectively. Other than this, the optical pumping structure of FIG. 9 is the same as the optical pumping structure of the FM-EDF amplifier 608 of FIG. 8.

Figure 10:
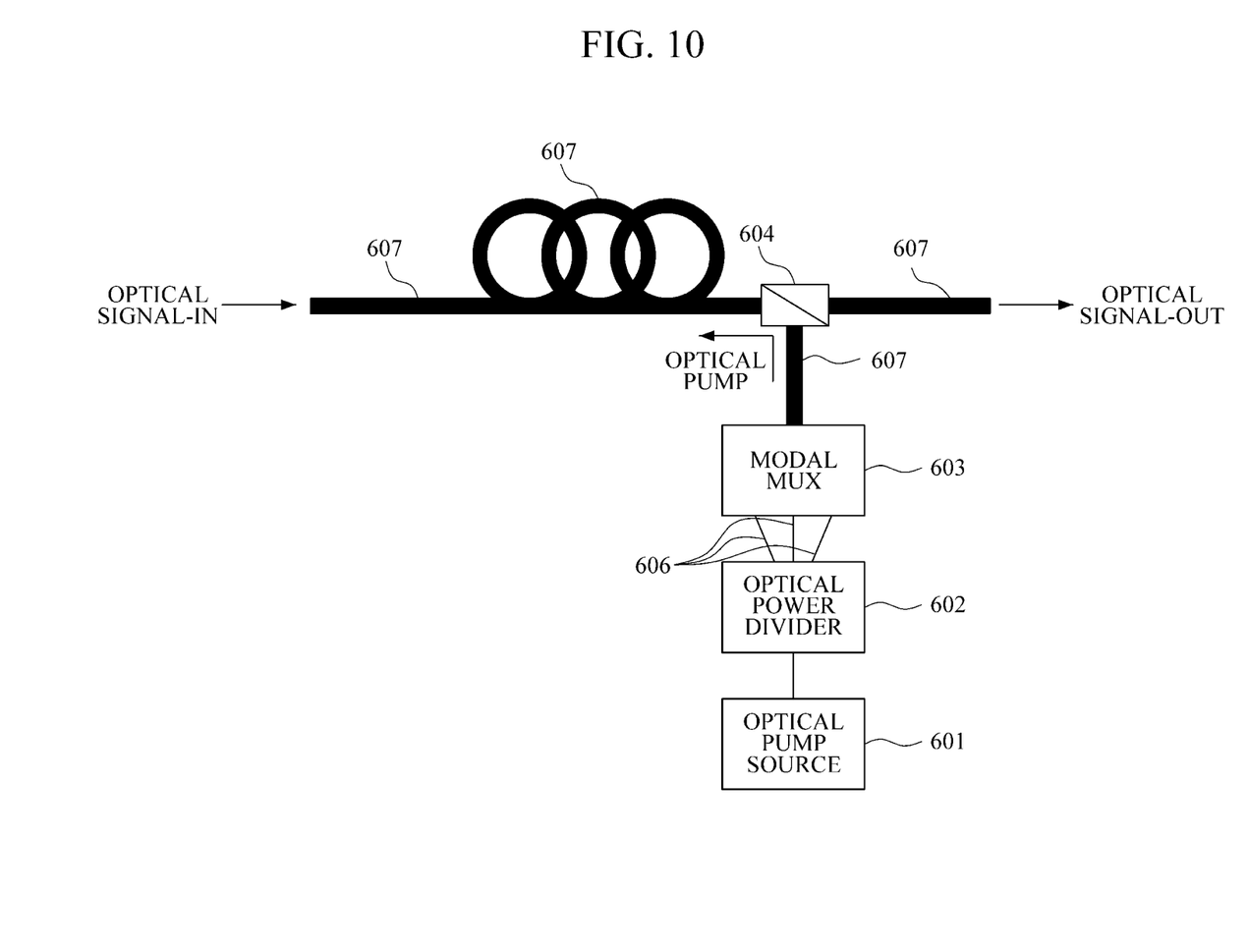
FIG. 10 is a diagram illustrating an optical pumping of an FFM amplifier according to another exemplary embodiment.

FIG. 10 is a diagram illustrating optical pumping of an FFM amplifier according to another exemplary embodiment.

In the optical pumping structures described with reference to FIGS. 6 to 9, it is the FM-FDF amplifier 608 that is optically pumped, whereas in the optical pumping structure of FIG. 10, optical pumping is directly performed in an FMF 607 used as an optical transmission path. In this structure of FIG. 10, amplification arises from stimulated Raman scattering (SRS) occurring in the FMF 607.

More specifically, an optical power divider 602 divides an optical power of an optical pump source 601 uniformly into three optical powers. In this case, an optical coupler may substitute for the optical power divider 602. The three outputs are connected to inputs of a modal multiplexer 603, respectively. An output from the modal multiplexer 603 is connected to an FMF 607. Reference numeral 604 denotes a dichroic mirror or a wavelength-division coupler. An optical pump may proceed to the FMF 607 as shown in FIG. 10. A wavelength of the optical pump is 1450 nm, and the number of modes supported by the FMF is equivalent to the number of optical signals. In a generally used Raman optical amplifier, a propagation direction of the optical pump is opposite to a propagation direction of the optical signal as shown in FIG. 10. However, the amplifier may be configured such that an optical pump propagates in a direction opposite to a direction in which an optical signal propagates, or such that the optical pump and the optical signal may propagate in a bidirectional manner.

According to the exemplary embodiments as described above, it is possible to uniformly distribute an optical power of an optical pump to all modes of a few-mode fiber, thereby reducing a gain difference among the modes during the optical pumping of the FMF amplifier.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pumping apparatus comprising:
   an optical pump source configured to generate an optical pump;
   an optical power divider configured to divide an optical power of the optical pump from the optical pump source so as to output several optical pumps with uniform optical power; and
   a modal multiplexer configured to receive the optical pumps from the optical power divider through a plurality of single-mode fibers, multiplex the received optical pumps, apply a multiplexed optical pump to each mode of a few-mode fiber (FMF) amplifier, and adjust a gain difference among modes, wherein the FMF amplifier obtains a gain by amplifying an optical signal with the optical pump,
   wherein:
      the modal multiplexer is configured to connect the plurality of single-mode fibers and a single few-mode fiber, and
      the modal multiplexer comprises:
         input ports comprising a plurality of single-mode fibers which are spaced apart from one another, thereby preventing coupling therebetween, and through which a plurality of optical pumps are received; and
         an output port configured to output the multiplexed optical pump to the few-mode fiber for all modes, support for which is provided by a tapered end portion of the modal multiplexer, in which coupling among the plurality of single-mode fibers of the input ports takes place.

2. The optical pumping apparatus of claim 1, wherein:
   the optical power divider uniformly divides the optical power of the optical pump from the optical pump source, and
   the modal multiplexer receives the optical pumps with uniform optical power from the optical power divider, multiplexes the received optical pumps and outputs a multiplexed optical pump to an optical link through a single few-mode fiber, such that the optical signal amplified by the FMF amplification does not have a gain difference among modes.

3. The optical pumping apparatus of claim 1, wherein a number of inputs of the plurality of single-mode fibers through which the optical pumps are input to the modal multiplexer is decided by a number of modes supported by the FMF amplifier.

4. The optical pumping apparatus of claim 1, wherein a propagation direction of an optical pump output from the modal multiplexer is the same as or opposite to a propagation direction of the optical signal amplified by the FMF amplifier, or the propagation directions of both the optical pump and the optical signal are combined to each other.

5. The optical pumping apparatus of claim 1, wherein the FMF amplifier is a few-mode erbium doped fiber (FM-EDF) amplifier.

6. An optical pumping apparatus comprising:
   a plurality of optical pump sources configured to generate optical pumps; and
   a modal multiplexer configured to receive the optical pumps through a plurality of single-mode fibers, respectively, multiplex the received optical pumps and apply a multiplexed optical pump to each mode of a few-mode fiber (FMF) amplifier, and adjust a gain difference among modes, wherein the FMF amplifier obtains a gain by amplifying an optical signal with the optical pump,
   wherein:
      the modal multiplexer is configured to connect the plurality of single-mode fibers and a single few-mode fiber, and
      the modal multiplexer comprises:
         input ports comprising a plurality of single-mode fibers which are spaced apart from one another, preventing coupling therebetween, and through which a plurality of optical pumps are received: and
         an output port configured to output the multiplexed optical pump to the few-mode fiber for all modes, support for which is provided by a tapered end portion of the modal multiplexer, in which coupling among the plurality of single-mode fibers of the input ports takes place.

7. The optical pumping apparatus of claim 6, wherein the modal multiplexer receives optical pumps with an identical optical power through the respective single-mode fibers, outputs an optical pump having uniform optical power with respect to all modes of a few-mode fiber and applies the optical pump to the FMF amplifier, such that the optical signal amplified by the FMF amplifier does not have a gain difference among modes.

8. The optical pumping apparatus of claim 6, wherein a number of inputs of the plurality of single-mode fibers through which the optical pumps are input to the modal multiplexer is decided by a number of modes supported by the FMF amplifier of an optical link.

9. The optical pumping apparatus of claim 6, wherein a propagation direction of the multiplexed optical pump output from the modal multiplexer is the same as or opposite to a propagation direction of the optical signal amplified by the FMF amplifier, or the propagation directions of both the optical pump and the optical signal are combined to each other.

10. The optical pumping apparatus of claim 6, wherein the FMF amplifier is a few-mode erbium doped fiber (FM-EDF) amplifier.

11. An optical pumping apparatus comprising:
    an optical pump source configured to generate an optical pump;

an optical power divider configured to divide an optical power of the optical pump from the optical pump source so as to output several optical pumps with uniform optical power; and a modal multiplexer configured to receive the optical pumps from the optical power divider through a plurality of single-mode fibers, multiplex the received optical pumps, apply a multiplexed optical pump to each mode of a single few-mode fiber (FMF), and adjust a gain difference among modes, wherein a gain is obtained by amplifying an optical signal with the optical pump in the FMF, wherein:

the modal multiplexer connects the plurality of single-mode fibers and the single few-mode fiber, and the modal multiplexer comprises:

input ports comprising a plurality of single-mode fibers which are spaced apart from one another, preventing coupling therebetween, and through which a plurality of optical pumps are received; and an output port configured to output the multiplexed optical pump to the few-mode fiber for all modes, support for which is provided by a tapered end portion of the modal multiplexer, in which coupling among the plurality of single-mode fibers of the input ports takes place.

12. The optical pumping apparatus of claim 11, wherein the FMF amplifies the optical signal via stimulated Raman scattering (SRS).

13. The optical pumping apparatus of claim 11, wherein a number of inputs of the plurality of single-mode fibers through which the optical pumps are input to the modal multiplexer is decided by a number of modes supported by the few-mode fiber on an optical link.

14. The optical pumping apparatus of claim 11, wherein a propagation direction of the optical pump output from the modal multiplexer is the same as or opposite to a propagation direction of the optical signal amplified by the FMF amplifier, or the propagation directions of both the optical pump and the optical signal are combined to each other.

15. An optical pumping apparatus comprising:

an optical pump source configured to generate an optical pump;

an optical power divider configured to divide an optical power of the optical pump from the optical pump source so as to output several optical pumps with uniform optical power; and a modal multiplexer configured to receive the optical pumps from the optical power divider through a plurality of single-mode fibers, multiplex the received optical pumps, apply a multiplexed optical pump to each mode of a few-mode fiber (FMF) amplifier, and adjust a gain difference among modes, wherein the FMF amplifier obtains a gain by amplifying an optical signal with the optical pump, wherein:

the modal multiplexer connects the plurality of single-mode fibers and a single few-mode fiber, and the modal multiplexer comprises:

input ports comprising a plurality of optical waveguides which are spaced apart from each other, preventing coupling therebetween, and through which a plurality of optical pumps are, respectively, received from the plurality of single-mode fibers; and an output port configured to output the multiplexed optical pump to the few-mode fiber for all modes, support for which is provided by a tapered end portion of the modal multiplexer, in which coupling among the plurality of optical waveguides of the input ports takes place.

16. An optical pumping apparatus comprising:

a plurality of optical pump sources configured to generate optical pumps; and a modal multiplexer configured to receive the optical pumps through a plurality of single-mode fibers, respectively, multiplex the received optical pumps and apply a multiplexed optical pump to each mode of a few-mode fiber (FMF) amplifier, and adjust a gain difference among modes, wherein the FMF amplifier obtains a gain by amplifying an optical signal with the optical pump, wherein:

the modal multiplexer connects the plurality of single-mode fibers and a single few-mode fiber, and the modal multiplexer comprises:

input ports comprising a plurality of optical waveguides which are spaced apart from each other, preventing coupling therebetween, and through which a plurality of optical pumps are, respectively, received from the plurality of single-mode fibers; and an output port configured to output the multiplexed optical pump to the few-mode fiber for all modes, support for which is provided by a tapered end portion of the modal multiplexer, in which coupling among the plurality of optical waveguides of the input ports takes place.

17. An optical pumping apparatus comprising:

an optical pump source configured to generate an optical pump;

an optical power divider configured to divide an optical power of the optical pump from the optical pump source so as to output several optical pumps with uniform optical power; and a modal multiplexer configured to receive the optical pumps from the optical power divider through a plurality of single-mode fibers, multiplex the received optical pumps, apply a multiplexed optical pump to each mode of a single few-mode fiber (FMF), and adjust a gain difference among modes, wherein a gain is obtained by amplifying an optical signal with the optical pump in the FMF, wherein:

the modal multiplexer connects the plurality of single-mode fibers and a single few-mode fiber, and the modal multiplexer comprises:

input ports comprising a plurality of optical waveguides which are spaced apart from each other, preventing coupling therebetween, and through which a plurality of optical pumps are, respectively, received from the plurality of single-mode fibers; and an output port configured to output the multiplexed optical pump to the few-mode fiber for all modes, support for which is provided by a tapered end portion of the modal multiplexer, in which coupling among the plurality of optical waveguides of the input ports takes place.

* * * * *